Jan. 1, 1957    J. H. McLEOD    2,775,918
MOUNT FOR REFLECTING AXICON
Filed March 14, 1955    2 Sheets-Sheet 2
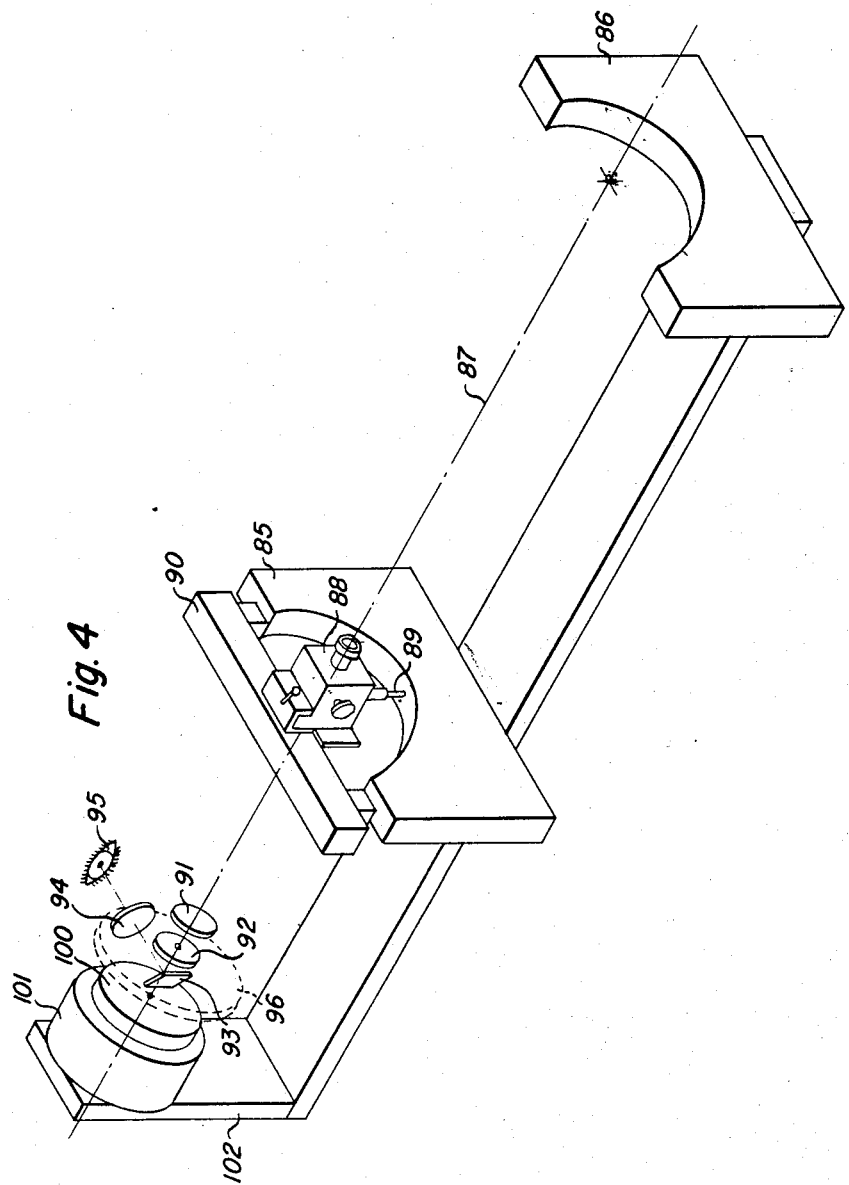
JOHN H. MC LEOD
INVENTOR.
BY
ATTORNEYS

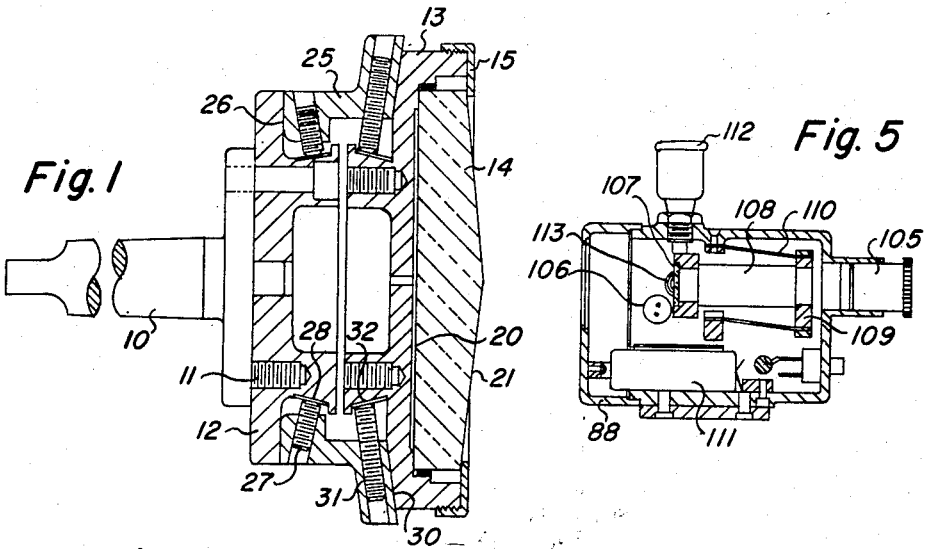
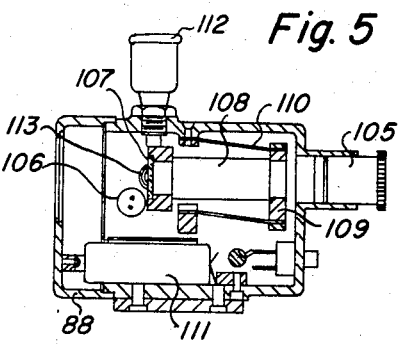
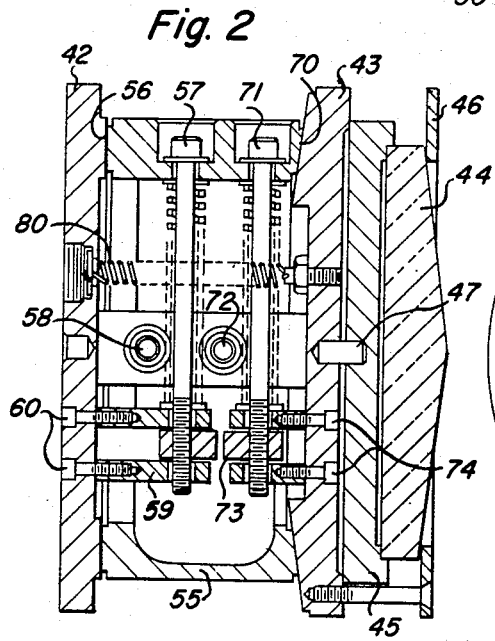

United States Patent Office 2,775,918
Patented Jan. 1, 1957

2,775,918

MOUNT FOR REFLECTING AXICON

John Henry McLeod, Rochester, N. Y., assignor to Eastman Kodak Company, Rochester, N. Y., a corporation of New Jersey Application March 14, 1955, Serial No. 494,089

1 Claim. (Cl. 88—14)

This invention relates to axicons which are a new type of optical element described in the Journal of the Optical Society of America, volume 44, No. 8, pages 592–597, August 1954, and also described in my patent application Serial No. 316,851, filed October 25, 1952, having to do with the application of axicons to optical aligners. Reference is also made to the co-filed application Serial No. 494,087 of Edgar S. Barnes having to do with a telescope for preliminary alignment of an axicon.

An axicon differs from other optical elements such as lenses, mirrors and prisms in that it defines a line in space of finite or infinite length and if a point source of light is used, a point of light can be detected anywhere along this line, even though the light is not focused there in the sense that the word focus is used in connection with lenses. In certain types of aligners a reflecting axicon is used and the most common form of reflecting axicon is a reflecting cone. For example, a reflecting axicon may take the form of a glass element having a plano surface and a convex conical surface. Either surface may be coated with metal to be reflecting, but it is customary to make the plano surface reflecting and to allow the light to pass through the element twice.

Reflecting axicons are not usually but may, if desired, be used like transmitting axicons. That is, a point source may remain fixed relative to the axicon and the image thereof at various points along the image line may be viewed or the viewing point may remain fixed and the source may be moved. However, it is customary to use a different system, one which is peculiarly valuable with reflecting axicons. The viewing point (which usually consists of a reticle and an eyepiece) is rigidly attached to the point source of light and both are moved together relative to the axicon.

Since this latter system maintains the source and the image at equal (or substantially equal) distances from the axicon, the magnification is always unity. The cross hairs may be slightly behind (or ahead of) the source without introducing objectionable error. In all theoretical discussions, one refers to the source as being on the axis of the axicon and the axis being the line defined in space. It is not absolutely essential that this be the case. In practice, the use of semitransparent mirrors or the like can be avoided if the viewer source combination is made up with the source and cross hairs spaced slightly apart so that the source is slightly to one side of the axicon axis and the cross hairs the same angular distance to the other side when the image is on the cross hairs. As the viewer source combination is moved, this same relationship holds so that the cross hairs move along a line parallel and very close to the axicon axis. The operator does not necessarily realize this in practice and it does not matter since he is making all his measurements relative to a line in space and his precision is unaffected by the fact that his line is offset from the axicon axis. The precision of an axicon is so far beyond any other known alignment system that it cannot be checked directly. Under certain conditions, it is apparently accurate to a few ten thousandths of an inch at a distance up to forty feet.

The object of the present invention is to provide a mount for a reflecting axicon to permit precise adjustment of the axicon in two different ways. One of these ways is purely transverse to the optic axis of the axicon or approximately transverse to this axis. If the axicon is oriented with its axis horizontal, the transverse adjustment may be either vertical or horizontal or two such adjustments at right angles to each other may be provided.

The other adjustment tilts the axicon, thus tipping the axis and this adjustment is arranged so that the axis swings about a point on itself some distance in front of the axicon, for example, at one of the points of observation. When a reflecting axicon is used as an aligner, the combination source and point of observation may be moved along a line from some close point, say two feet away, up to some much more distant point. The second adjustment provided by the mount according to the present invention rotates the axicon about a point on its axis, which point may be either in front of or behind the axicon, but is most useful when it is in front of the axicon so that the observation station may be located at the point while the axicon is being first adjusted.

Axicons are used to test various units such as machine tools and reflecting axicons are normally attached to the unit being tested. For example, the reflecting axicon may be held by the chuck or face plate of a lathe under test. Such a unit has an axis of its own and the purpose of the reflecting axicon in this case is to check the alignment of this axis relative to the lathe bed.

According to the invention, a mount is provided for a reflecting axicon made up of a double support. The main support is one to be held by the unit under test and the second support, approximately axially aligned with the main support, rigidly holds the axicon. Means such as springs or set screws engaging beveled surfaces are provided for urging the two supports toward each other. The supports are held apart by a tubular member surrounding the axis and approximately axially aligned. The tubular member engages a plano surface on one of the supports which plano surface is orthogonal to the axis or approximately so and the other end of the tubular member engages a spherical surface, the sphere being centered on the axis. The tubular member may have a relatively thin wall section, but in general it is a fairly heavy member and the end surfaces are shaped the same as the surfaces which they engage on the supports; that is, one of the end surfaces of the tubular member is plano and the other end surface is spherical. Finally, means are provided for transversely adjusting the tubular member along the plano surface and holding it at any desired point thereon and for independently moving it along the spherical surface and again holding it at any desired point thereon.

It does not matter too much which support has the plano surface and which one has the spherical surface. If the center of rotation of the movement caused by adjustment along the spherical surface is to be in front of the axicon, the spherical surface should be concave to the front, no matter which support it is on. In general, it is more convenient to have the plano surface on the main support and to have the spherical surface on the second support which holds the axicon itself.

The principle of the invention will be more fully understood when read in connection with the accompanying drawings in which:

Fig. 1 is a vertical section of one embodiment of the invention;

Fig. 2 is a vertical section of a preferred embodiment of the invention; and

Fig. 3 is a front elevation of the arrangement shown in Fig. 2.

Fig. 4 illustrates the operation of the invention in making a setting.

Fig. 5 illustrates a typical viewer for use with reflecting axicons.

In Fig. 1 a unit 10 whose alignment is to be tested is illustrated as a rod to be held by the chuck of a lathe. For example, one may be checking to see whether the axis of rotation of this chuck is strictly parallel to the lathe bed. By means of screw clamps 11, a main support 12 is held by this unit 10. A second support 13 rigidly holds a reflecting axicon 14 by means of a clamping ring or clips 15. The rear surface 20 of the axicon 14 is plano and is metal coated to be highly reflecting. The front surface 21 is a convex cone.

The two supports 12 and 13 are held apart by a tubular member 25 which engages a plano surface 26 on the mount 12 and a spherical surface 30 on the mount 13. This tubular member 25 is held in place by eight set screws 27 and 31. The surfaces 28 and 32 which the set screws engage, are sloped so that the clamping action of the set screws tends to urge the supports 12 and 13 toward each other. Adjustment of the set screws 27 causes relative movement between the tubular member 25 and the support 12 along the plano surface 26 which is transverse to the axis of the unit 10.

On the other hand, adjustment of the set screws 31 causes relative movement between the tubular member 25 and the second support 13 along the spherical surface 30 whose center of curvature is approximately on the axis of the axicon 14.

The arrangement shown in Fig. 2 accomplishes this same result in a somewhat more elegant and convenient fashion. The unit to which the axicon mount is to be clamped is not shown in Fig. 2 but the clamping may be done in any of the standard ways in which plates are attached to the spindle of a lathe, for example. The main support in this case is the plate 42 and the secondary support is the member 43 which holds the axicon 44 along with its cup 45 by means of a clamping ring or other support 46. The center of the cup 45 is provided with a center hole 47 for approximate alignment of the axicon in the secondary support 43. As before, a tubular member, 55 in this case, separates the supports 42 and 43 engaging the support 42 at a plano surface 56 and engaging the support 43 at a spherical surface 70.

Vertical motion of the tubular member 55 relative to the support 42 along the plano surface 56 is provided by an adjusting screw 57 which engages a nut in a nut retainer 59 which is attached by screws 60 rigidly to the support 42. Horizontal adjustment is similarly provided by a single screw member 58, the nut for which is not shown but which engages a nut in a nut retainer clamped to the base plate 42 in the same as the nut retainer 59 is. Sufficient horizontal clearance is provided with respect to the vertical adjustment 57 so that horizontal adjustment is controlled solely by the screw 58. Similarly there is sufficient vertical clearance with respect to the screw 58 so as not to interfere with the vertical adjustment provided by the screw 57. There may be a slight but quite harmless rotary motion of the tube 55 as the screws are adjusted.

Relative movement between the tubular member 55 and the secondary support 43 is similarly provided by a vertical screw 71 and a horizontal screw 72. The vertical screw 71 engages a nut 73 in a retainer fastened to the secondary mount 43 by machine screws 74. In practice the tubular member 55 is first adjusted relative to the support 42 by means of the screws 57 and 58. The tubular member is then left fastened in place and spherical adjustment of the support 43 is provided by turning the screws 71 and 72. It is sometimes then necessary, of course, to readjust the screws 57 and 58 to correct any change in the transverse setting of the unit.

The supports 42 and 43 are urged toward each other by four springs, one of which is shown at 80.

Fig. 4 is just one of possibly hundreds of examples of how the present invention may be used.

When one wants to check the alignment of the lower bearing shells in a turbine, one may first determine the location of a line (in space) between the centers of the two end shells and then adjust all the intermediate shells to bring their centers onto this line. To do this with a reflecting axicon the first step is to set up the axicon so that its axis passes through the first and last shell centers. This operation is where both the present invention and the invention in the co-filed Barnes application come into use.

In Fig. 4 the semi-circular members 85 and 86 represent the two end bearing shells of a turbine and the broken line 87 is the line between their centers. A combination light source viewer 88 is mounted alternately in the shells 85 and 86. An adjustable wand 89 which may be moved to contact different points on the semi-circular shell determines when the unit 88 is approximately centered. The whole viewer unit 88 including the source and the cross hairs can be rigidly clamped to a support 90 consisting of a bar resting on the two ends of the shell. To speed up the operation, the axicon 100 in its adjustable mount 101 (made according to the present invention) is supported approximately in proper alignment (i. e. pointing approximately along the line 87) on a support 102. The first adjustment is a rough one and is made by turning on the lamp in the source unit 88, or by mounting a temporary target on the unit for this preliminary alignment step and then by focusing an image thereof by a telescope lens 91 on a reticle 92, which by means of a mirror 93 and an eyepiece 94 is viewed by the eye 95 of an observer. In practice this auxiliary viewing unit is carried by the cover plate 96 which covers the axicon and which is removed when this first crude alignment is completed by checking the source first in the shell 85 and then in the shell 86.

The cover plate is now removed and the axicon image of the source in unit 88 is viewed at this same unit 88 through an eyepiece 105. The details of this unit 88 are shown in Fig. 5.

The problem is to locate the center of each shell precisely both horizontally and vertically and to place the cross hairs of the viewer so that the axis of the axicon passes precisely through this center midway between the source and the cross hairs as evidenced by the image appearing on the cross hairs. This involves adjusting the axicon transversely (horizontally and vertically) and by tilting it (also both horizontally and vertically). The cross hairs are adjustable both horizontally and vertically. Locating these two centers (one for each shell) and pointing the axicon precisely through both centers involves a series of careful steps but the end result is extreme precision and the steps are simplified by the axicon mount made according to the present invention. For example, when the tilting operation (either horizontally or vertically) is a rotation about the near shell center, such tilting will not affect the reading at the near shell center. Thus, whenever the viewer is at the far shell center, the axicon can be tilted (either horizontally or vertically) to bring the image to some desired point without affecting the setting with respect to the near shell center. Once the axis points through the near shell center, the only operation is to tilt the axicon until the axis points through the far shell center and then the axis points through both centers and the required line 87 is fully and precisely defined.

Fig. 5 shows a typical source and viewer which includes an eyepiece 105, a lamp 106 (lighted by power from a battery 111) and a reticle 107 offset slightly both laterally and longitudinally from the source 106. When the unit is finally set up the axis of the axicon will pass half way between the source and the cross hairs and hence the cross hairs will actually be offset slightly from the axis, but the offset remains the same for all positions of the viewer. The reticle 107 is adjustable both horizontally and vertically. The mount for the reticle 107 is carried by flat springs or reeds 108 which bend to allow horizontal movement only of the reticle. These springs 108 are anchored to a floating frame 109 which is in turn carried by flat springs or reeds 110 which bend to allow vertical movement only. The reeds 108 and 110 are under tension (spring loaded) to hold the reticle against vertical (112) and horizontal (113) micrometers.

The eyepiece 105 is shown as direct viewing. As is common with sighting telescopes, the eyepiece may include a mirror to permit oblique viewing whenever this is more convenient for the observer.

I claim:

For use in axicon testing of the alignment of a unit having an axis, a mount for a reflecting cone type axicon, comprising a main support to be held by the unit, a second support rigidly holding the axicon approximately axially aligned with the main support, one of the supports having a plano surface orthogonal to the axis and the other support having a spherical surface centered on the axis at a point in front of the axicon, means for urging the two supports toward each other, a tubular member approximately axially aligned and separating the two supports engaging said plano surface and said spherical surface and means for transversely adjusting the tubular member along said plano surface and independently along said spherical surface.

References Cited in the file of this patent

UNITED STATES PATENTS 2,311,186    Lobdell _____ Feb. 16, 1943

FOREIGN PATENTS 10,660    Great Britain _____ of 1904